US011697162B2

(12) United States Patent
Pankalla et al.

(10) Patent No.: US 11,697,162 B2
(45) Date of Patent: Jul. 11, 2023

(54) COMBINATION TOOL AND TOOL HOLDER FOR A COMBINATION TOOL

(71) Applicant: KYOCERA UNIMERCO TOOLING A/S, Sunds (DK)

(72) Inventors: Sven Pankalla, Huskvarna (SE); Anders Svensson, Lekeryd (SE)

(73) Assignee: KYOCERA UNIMERCO TOOLING A/S, Sunds (DK)

( * ) Notice: Subject to any disclaimer, the term of this patent is extended or adjusted under 35 U.S.C. 154(b) by 143 days.

(21) Appl. No.: 16/979,181

(22) PCT Filed: Feb. 13, 2019

(86) PCT No.: PCT/EP2019/053582
§ 371 (c)(1),
(2) Date: Sep. 9, 2020

(87) PCT Pub. No.: WO2019/170378
PCT Pub. Date: Sep. 12, 2019

(65) Prior Publication Data
US 2020/0406371 A1 Dec. 31, 2020

(30) Foreign Application Priority Data

Mar. 9, 2018 (DE) ............. 10 2018 105 519.6

(51) Int. Cl.
*B23B 31/30* (2006.01)
*B23B 31/40* (2006.01)
*B23C 3/05* (2006.01)
*B23B 51/10* (2006.01)

(52) U.S. Cl.
CPC ............ *B23B 31/305* (2013.01); *B23B 31/40* (2013.01); *B23C 3/055* (2013.01); *B23B 51/108* (2013.01); *B23B 2270/025* (2013.01)

(58) Field of Classification Search
CPC . B23B 31/305; B23B 31/40; B23B 2270/025; B23B 51/108; B23B 31/1178; B23B 31/402; B23C 3/055
See application file for complete search history.

(56) References Cited

U.S. PATENT DOCUMENTS

| | | | | |
|---|---|---|---|---|
| 4,467,977 A | * | 8/1984 | Gattrugeri | ............ B65H 75/243 |
| | | | | 279/2.15 |
| 6,179,530 B1 | | 1/2001 | Retzbach et al. | |
| 7,140,819 B2 | * | 11/2006 | Broghammer | .... B23B 29/03457 |
| | | | | 408/180 |
| 2004/0191022 A1 | | 9/2004 | Broghammer et al. | |

(Continued)

FOREIGN PATENT DOCUMENTS

| | | |
|---|---|---|
| DE | 29614727 U1 | 10/1996 |
| DE | 20216739 U1 | 3/2004 |
| DE | 102006005379 A1 * | 8/2007 ......... B23B 29/0341 |

(Continued)

*Primary Examiner* — Sunil K Singh
*Assistant Examiner* — Reinaldo A Vargas Del Rio
(74) *Attorney, Agent, or Firm* — Viering, Jentschura & Partner mbB (57) ABSTRACT

A combination tool including a tool holder that extends along a tool rotational axis that defines an axial extension, an inner cutting tool for machining a first, central hole region and an outer, sleeve-shaped cutting tool for machining a second hole region radially outwards relative to the first hole region.

21 Claims, 5 Drawing Sheets

(56) References Cited

U.S. PATENT DOCUMENTS

2005/0002746 A1    1/2005   Kress et al.
2016/0214183 A1*   7/2016   Kanaboshi .............. B23C 3/055

FOREIGN PATENT DOCUMENTS

| DE | 102006016290 A1 | | 10/2007 | |
|---|---|---|---|---|
| DE | 102012209312 A1 | * | 12/2013 | ........... B23B 31/026 |
| DE | 102012111456 A1 | * | 5/2014 | ........... B23B 31/005 |
| WO | 2003013771 A1 | | 2/2003 | |
| WO | WO-2008054294 A1 | * | 5/2008 | ........... B23B 31/305 |

* cited by examiner

COMBINATION TOOL AND TOOL HOLDER FOR A COMBINATION TOOL

CROSS-REFERENCE TO RELATED APPLICATIONS

This application is a national stage entry according to 35 U.S.C. 371 of PCT Application No. PCT/EP2019/053582 filed on Feb. 13, 2019, which claims priority to German Application No. 10 2018 105 519 filed on Mar. 9, 2018, which are entirely incorporated herein by reference.

TECHNICAL FIELD

The present disclosure relates to a combination tool and a tool holder for a combination tool.

BACKGROUND

A combination tool is discussed, for example, in WO 03/013771 A1.

SUMMARY

A combination tool is provided by the present disclosure, which allows for simultaneous machining of two coaxial hole regions by two cutting tools with a high machining precision, wherein both cutting tools are easily removable. A tool holder for a combination tool is also established by the present disclosure, by which two cutting tools may be simultaneously mounted, wherein the cutting tools are easily removable and nevertheless machining with high precision is possible.

The present disclosure provides a combination tool with a tool holder that extends along a tool rotational axis that defines an axial extension, an inner (for example, central) cutting tool for machining a first, central hole region and an outer sleeve-shaped cutting tool for machining a second hole region radially outward relative to the first hole region, wherein the tool holder includes a distal axial tool mounting end section that has a central (and for example, axially extending) tool mounting opening for mounting the inner cutting tool and a tool mounting peripheral surface (for example, a tool mounting outer peripheral surface) surrounding (for example, coaxially surrounding) the central tool mounting opening for mounting the outer cutting tool (for example, thereon), so that when the inner and outer cutting tool are mounted, the tool mounting end section extends radially between the inner and the outer cutting tool, wherein a hydraulic chamber is formed in the tool mounting end section, in which a hydraulic fluid is contained that is variably settable under a hydraulic pressure, and wherein the tool mounting end section includes an outer clamp wall elastically deflectable radially outwards and an inner clamp wall elastically deflectable radially inwards, which define the hydraulic chamber in sections (for example, radially) so that through an increase of the hydraulic pressure in the hydraulic chamber both the outer clamp wall is elastically deflectable (radially) outwards to exert a (radial) clamping force on the mounted outer cutting tool, through which, the outer cutting tool is clampable to the tool holder, as well as the inner clamp wall is elastically deflectable (radially) inwards to exert a (radial) clamping force on the mounted inner cutting tool, through which, the inner cutting tool is clampable to the tool holder.

The hydraulic chamber further includes a second, outer hydraulic chamber section, formed in a section of the tool mounting end section of the tool holder that is axially adjacent to a distal (in a direction to the drive side) axial end section, and formed ring-shaped and encircling (for example, coaxially encircling) the tool rotational axis and defined radially outwards by a second outer (for example, annular shaped) peripheral clamp wall section (for example, an outer peripheral clamp wall section) of the outer clamp wall, and the hydraulic chamber further includes a second, inner hydraulic chamber section, (also) formed in a section of the tool mounting end section of the tool holder that is axially adjacent to a distal axial end section, optionally formed axially level with the second outer hydraulic chamber section, and formed ring-shaped and encircling (for example, coaxially encircling) the tool rotational axis and defined radially inwards by a second inner (for example, annular shaped) peripheral clamp wall section (for example, an inner peripheral clamp wall section) of the inner clamp wall, wherein an annular wall of the tool mounting end section extends radially between the second, outer hydraulic chamber section and the second, inner hydraulic chamber section, by which the clamping force exerted by the second outer peripheral clamp wall section on the mounted outer cutting tool and the clamping force exerted by the second inner peripheral clamp wall section on the mounted inner cutting tool are counteractable (i.e., at least substantially counteractable).

The designation "radial" means "radial in relation to the tool rotational axis", and the designation "axial" means "in the direction of the tool rotational axis".

Due to the hydraulic attachment, both cutting tools are quickly removable by merely reducing the hydraulic pressure, whereby the clamp walls return to their non-deflected position due to their elastic restoring force and thereby release the cutting tools. This applies, vice versa, for the re-attachment of both cutting tools mounted on the tool holder. Furthermore, very high clamping forces may be easily produced, whereby both cutting tools may be very tightly attached to the tool holder, which contributes to a high machining precision. Additionally, the combination tool may be relatively simply assembled, and may be provided, for example, with only three separate main components, namely the tool holder and both cutting tools.

The tool holder includes, for example, a drive mounting end section axially opposite to the tool mounting end section, which includes a drive mounting coupling part, that is formed, relative to the tool rotational axis, in such a way that it may be coupled in a form-fitting or interference-fitting engagement for co-rotation with a drive coupling part of a rotary drive.

The inner clamp wall may be formed ring-shaped and coaxially encircle the tool rotational axis, and the outer clamp wall may be formed ring-shaped and coaxially encircle the tool rotational axis.

The hydraulic chamber may have a first hydraulic chamber section that is formed in a distal (i.e., distal to the drive side) axial end section of the tool mounting end section of the tool holder and that is formed ring-shaped and encircles the tool rotational axis (for example, coaxially encircles) and defined radially outwards by a first outer (for example, ring-shaped) peripheral clamp wall section of the outer clamp wall, and defined radially inwards by a first inner (for example, ring-shaped) peripheral clamp wall section of the inner clamp wall, so that the clamping force exerted by the first outer peripheral clamp wall section and by the first inner peripheral clamp wall section via hydraulic fluid present in the first hydraulic chamber section is transferred radially between the first outer and the first inner peripheral clamp wall section (in this way, the clamping force is exerted radially outwards by the first outer peripheral clamp wall section, and the clamping force is exerted radially inwards by the first inner peripheral clamp wall section).

The respective first and second peripheral clamp wall sections extend, for example, respectively, coaxially around the tool rotational axis.

The radial, elastic flexibility of the second outer peripheral clamp wall section may be greater than the radial, elastic flexibility of the first outer peripheral clamp wall section, so that based on an equal hydraulic pressure the clamping force exerted by the second outer peripheral clamp wall section is greater than the clamping force exerted by the first outer peripheral clamp wall section. Thereby, as the clamping force exerted on the outer cutting tool is decreased on the distal end section of the tool holder, the danger is, for example, reduced, that the orientation and/or position of the cutting edges of the outer cutting tool, which are arranged, for example, axially level with the distal end section of the tool holder, are affected by the clamping force of the first outer peripheral clamp wall section. This may contribute to a further improved machining precision. The stable attachment is nevertheless maintained, due to the second outer peripheral clamp wall section and, on the other hand, for example, also due to both inner peripheral clamp wall sections, a higher clamping force is exerted or may be exerted.

The first outer peripheral clamp wall section may have a radial wall thickness that is greater than the radial wall thickness of the second outer peripheral clamp wall section. Hereby it may, for example, be achieved, that the radial deflectability of the second outer peripheral clamp wall section is greater than the radial deflectability of the first outer peripheral clamp wall section.

The hydraulic chamber may include a pressure chamber section, which is defined by a movable piston, through which movement thereof the volume of the hydraulic chamber may be varied to a corresponding increase and decrease of the hydraulic pressure in the hydraulic chamber.

The movable piston may be constituted by a screw, optionally a set screw, which is screwable into the pressure chamber section. Hereby, for example, simply by manually turning the screw the hydraulic pressure in the hydraulic chamber may be increased or decreased, whereby both the cutting tools are easily manually attachable to and detachable from the tool holder. The set screw may be provided, for example, at its head-end, with a sealing element, for example, a plastic sealing element, to thereby achieve a, for example, improved, piston seal against the inner wall of the pressure chamber section.

The pressure chamber section may be hydraulically connected (i.e., in fluid communication) with the second, inner hydraulic chamber section via a first (for example, formed in the tool holder) connection channel, and the pressure chamber section may be hydraulically connected with the second, outer hydraulic chamber section (also, for example, formed in the tool holder) via a second connection channel differing from the first connection channel.

The first hydraulic chamber section may be directly hydraulically connected with the second, inner hydraulic chamber section (and, for example, be axially (hydraulically) connected) and, for example, only, indirectly connected with the second, outer hydraulic chamber section via, for example, the pressure chamber section.

The second, outer hydraulic chamber section may extend farther radially outwards (relative to the tool rotational axis) than the first hydraulic chamber section. I.e., the second, outer hydraulic chamber section may extend ring-shaped (and, for example, coaxially) with a larger diameter around the tool rotational axis than the first hydraulic chamber section. This makes it possible that the outer cutting tool is provided/may be provided with a larger diameter axially level with the second hydraulic chamber section than axially level with the first hydraulic chamber section, so that it may include an axial shoulder (approximately axially level with the first hydraulic chamber section or approximately axially level between the first and both the second hydraulic chamber sections), on the front end of which, cutting edges are/may be arranged, which, for example, are arranged axially level with the first hydraulic chamber section. The outer cutting tool may machine, for example, front end material, with such front end cutting edges.

The outer cutting tool may (generally) be provided with a number (for example, 2 or 3 or more) of cutting edges, that are provided on the mounted outer cutting tool axially level with the first hydraulic chamber section. The outer cutting tool may comprise, for example, a cutting edge holder, on which an inner peripheral surface of the outer cutting tool of the tool mounting end section of the tool holder is formed, and the cutting edges may be mounted on the cutting edge holder, wherein the cutting edges may be formed, for example, monolithically of the same material with the cutting edge holder or may be formed from a different material than the cutting edge holder and fixed thereto. The cutting edges of the outer cutting tool may be made of, e.g., PCD (polycrystalline diamond), hard metal (German term: Hartmetall) with coating (e.g., a coating made of diamond-like carbon (DLC), physical vapor deposition (PVD), or chemical vapor deposition (CVD)), hard metal (German term: Hartmetall) without coating, pCBN (polycrystalline cubic boron nitride), or cermet.

The inner cutting tool may be, for example, a drill with, for example, front end cutting edges and/or a reamer with, for example, cutting edges arranged on a peripheral surface of the inner cutting tool.

The outer cutting tool may be, when mounted on the tool holder, axially level with the second, outer hydraulic chamber section without cutting edges. Hereby, for example, a negative effect of the clamping force, that is exerted by the second outer and the second inner peripheral clamp wall section and that is, for example, greater than the clamping force exerted by the first outer and first inner peripheral clamp wall section, on the position/and or orientation of the cutting edges of the outer cutting tool (that are arranged axially level with the first peripheral clamp wall section) may be reduced or even eliminated.

The outer cutting tool may be provided with an axial protrusion or an axial recess, wherein the tool holder may be provided with a (thereto corresponding) axial recess for form-fitting engagement with the axial protrusion of the mounted outer cutting tool or with an axial protrusion for form-fitting engagement with an axial recess of the mounted outer cutting tool, to at least assist the transfer of torque around the tool rotational axis from the tool holder to the outer cutting tool.

The radial thickness of the first hydraulic chamber may be greater than the radial thickness of the second, outer hydraulic chamber and/or than the radial thickness of the second, inner hydraulic chamber. I.e., the radial distance between the first inner and the first outer peripheral clamp wall section, which radially face one another and radially define the first hydraulic chamber, may be greater than the radial distance between the second inner peripheral clamp wall section and the radial thereto facing inner peripheral wall section of the annular wall and/or may be greater than the radial distance between the second outer peripheral clamp wall and the radial thereto facing outer peripheral wall section of the annular wall.

Due to, for example, this greater radial thickness of the first hydraulic chamber and/or, for example, due to the greater deflectability of the first outer peripheral clamp wall section, vibrations, for example, from the inner and outer cutting tool may be attenuated.

The tool holder may include, an axial stop in the tool mounting opening, which the mounted inner cutting tool can butt against, so that axial displaceability of the inner cutting tool in a direction of the tool mounting opening is limited by the axial stop.

The axial stop may be designed to be axially adjustable, wherein the axial stop is optionally designed as an axially adjustable screw, optionally as an axially adjustable set screw, that is axially screwable in the tool mounting opening of the tool holder.

A combination tool such as one described in the present disclosure may be employed for machining, optionally for simultaneous machining, of a central hole for mounting a valve guide bushing and a thereto coaxial and radially outwards recess for mounting a valve seat ring in a cylinder head. The machining of the central hole and/or the machining of the outer recess herein encompass both additional machining of an already existing hole, as well as the creation (for example, drilling) of the central hole and the outer recess, in the cylinder head.

Furthermore, a combination tool such as one described in the present disclosure may be employed for machining, optionally for simultaneous machining, of a valve guide bushing and a valve seat ring in a cylinder head.

The present disclosure further provides a tool holder for a combination tool as described in the present disclosure, wherein the tool holder extends along a tool rotational axis that defines an axial extension, and the tool holder includes a distal axial tool mounting end section that has a central tool mounting opening for mounting an inner (for example, central) cutting tool and a tool mounting peripheral surface surrounding (for example, coaxially) the central tool mounting opening for mounting an outer cutting tool, so that when the inner and outer cutting tool are mounted, the tool mounting end section extends radially between the inner and outer cutting tool, wherein a hydraulic chamber is formed in the tool mounting end section, in which a hydraulic fluid is contained that is variably settable under a hydraulic pressure, and wherein the tool mounting end section includes an outer clamp wall elastically deflectable radially outwards and an inner clamp wall elastically deflectable radially inwards, which define the hydraulic chamber in sections so that through an increase of the hydraulic pressure in the hydraulic chamber both the outer clamp wall is elastically deflectable (radially) outwards to exert a (radial) clamping force on the mounted outer cutting tool, through which, the outer cutting tool is clampable to the tool holder, as well as the inner clamp wall is elastically deflectable (radially) inwards to exert a (radial) clamping force on the mounted inner cutting tool, through which, the inner cutting tool is clampable to the tool holder, wherein the hydraulic chamber has a first hydraulic chamber section formed in a distal (i.e., axially distal to the drive side) axial end section of the tool mounting end section of the tool holder, formed ring-shaped and (for example, coaxially) encircling the tool rotational axis and defined radially outwards by a first outer peripheral clamp wall section of the outer clamp wall and defined radially inwards by a first inner peripheral clamp wall section of the inner clamp wall, so that the clamping force exerted by the first outer peripheral clamp wall section and by the first inner peripheral clamp wall section via the present hydraulic fluid in the first hydraulic chamber section is transferred radially between the first outer and the first inner peripheral clamp wall section, and wherein the hydraulic chamber includes a second, outer hydraulic chamber section formed in a section of the tool mounting end section of the tool holder that is axially adjacent to the distal axial end section, formed ring-shaped and (for example, coaxially) encircling the tool rotational axis and defined radially outwards by a second outer peripheral clamp wall section of the outer clamp wall, and wherein the hydraulic chamber includes a second, inner hydraulic chamber section formed in the section of the tool mounting end section of the tool holder that is axially adjacent to the distal axial end section, optionally formed axially level with the second outer hydraulic chamber section, formed ring-shaped and (for example, coaxially) encircling the tool rotational axis and defined radially inwards by a second inner peripheral clamp wall section of the inner clamp wall, wherein an annular wall of the tool mounting end section extends radially between the second, outer hydraulic chamber section and the second, inner hydraulic chamber section, by which the clamping force exerted by the second outer peripheral clamp wall section on the mounted outer cutting tool and the clamping force exerted by the second inner peripheral clamp wall section on the mounted inner cutting tool are counteractable (i.e., at least substantially counteractable).

The present disclosure also provides a tool holder for a combination tool as described in the present disclosure, wherein the tool holder extends along a tool rotational axis that defines an axial extension, and the tool holder includes a distal axial tool mounting end section that has a central tool mounting opening for mounting an inner (for example, central) cutting tool and a tool mounting peripheral surface surrounding the central tool mounting opening for mounting an outer cutting tool, so that when the inner and outer cutting tool are mounted, the tool mounting end section extends radially between the inner and outer cutting tool, wherein a hydraulic chamber is formed in the tool mounting end section, in which a hydraulic fluid is contained that is variably settable under a hydraulic pressure, and wherein the tool mounting end section includes an outer clamp wall elastically deflectable radially outwards and an inner clamp wall elastically deflectable radially inwards, which define the hydraulic chamber in sections, so that through an increase of the hydraulic pressure in the hydraulic chamber both the outer clamp wall is elastically deflectable (radially) outwards to exert a clamping force on the mounted outer cutting tool, through which, the outer cutting tool is clampable to the tool holder, as well as the inner clamp wall is elastically deflectable (radially) inwards to exert a clamping force on the mounted inner cutting tool, through which, the inner cutting tool is clampable to the tool holder, wherein the tool holder includes an axial stop in the tool mounting opening, which the mounted inner cutting tool can butt against, so that axial displaceability of the inner cutting tool in a direction of the tool mounting opening is limited by the axial stop.

The respective tool holders, as described above, may further individually have respective optional features mentioned in the scope of the above description of the corresponding combination tool. For example, the tool holder may be further formed as described below.

The radial, elastic flexibility of the second outer peripheral clamp wall section may be greater than the radial, elastic flexibility of the first outer peripheral clamp wall section, so that based on an equal hydraulic pressure the clamping force exerted by the second outer peripheral clamp wall section is greater than the clamping force exerted by the first outer peripheral clamp wall section.

The first outer peripheral clamp wall section may have a radial wall thickness that is greater than the radial wall thickness of the second outer peripheral clamp wall section.

The hydraulic chamber may include a pressure chamber section, which is defined by a movable piston through which movement thereof varies the volume of the hydraulic chamber to a corresponding increase and decrease of the hydraulic pressure in the hydraulic chamber.

The movable piston may be constituted by a screw, optionally a set screw, which is screwable into the pressure chamber section.

The pressure chamber section may be hydraulically connected with the second, inner hydraulic chamber section via a first connection channel and wherein the pressure chamber section may be hydraulically connected with the second, outer hydraulic chamber section via a second connection channel differing from the first connection channel.

The first hydraulic chamber section may be directly hydraulically connected with the second, inner hydraulic chamber section and only indirectly connected with the second, outer hydraulic chamber section via the pressure chamber section.

The second, outer hydraulic chamber section may extend farther radially outwards than the first hydraulic chamber section.

The tool holder may include an axial stop in the tool mounting opening, which the mounted inner cutting tool can butt against, so that axial displaceability of the inner cutting tool in a direction of the tool mounting opening is limited by the axial stop.

The axial stop may be designed to be axially adjustable, wherein the axial stop may be optionally designed as an axially adjustable screw, optionally as an axially adjustable set screw, that is axially screwable in the tool mounting opening of the tool holder.

As long as not otherwise stated, the expressions first and second simply represent a particular notation of the therewith identified features and, therefore, determine no particular sequence of the existence/occurrence of the therewith identified features.

BRIEF DESCRIPTION OF THE DRAWINGS

The present disclosure will be further described hereafter by means of non-limiting embodiments. In the drawings are shown.

The same reference numbers are used for the same elements for all of the figures.

DETAILED DESCRIPTION

With reference to the FIGS. 1-4 and 5A-5C, a combination tool 10 according to a non-limiting embodiment of the present disclosure includes a tool holder 12 that extends along a tool rotational axis 14 that defines an axial extension, an inner cutting tool 16 for machining a first, central hole region 18 (see, for example, FIGS. 5A and 5B) and an outer, sleeve-shaped cutting tool 20 for machining a second hole region 22 (see FIGS. 5A and 5B) radially outward relative to the first hole region 18, wherein the tool holder 12 includes a distal (i.e., axially distal to a drive side 23 of the tool holder 12) axial tool mounting end section 24 that has a central, axially extending tool mounting opening 26 for mounting the inner cutting tool 16 and a tool mounting peripheral surface 28 surrounding the central tool mounting opening 26 for mounting the outer cutting tool 20, so that when the inner and outer cutting tool 16, 20 are mounted, the tool mounting end section 24 extends radially between the inner and the outer cutting tool 16, 20, wherein a hydraulic chamber 30 is formed in the tool mounting end section 24, in which a hydraulic fluid is contained that is variably settable under a hydraulic pressure, and wherein the tool mounting end section 24 includes an outer clamp wall 32 elastically deflectable radially outwards and an inner clamp wall 34 elastically deflectable radially inwards, which define the hydraulic chamber 30 in sections, so that through an increase of the hydraulic pressure in the hydraulic chamber 30 both the outer clamp wall 32 is elastically deflectable radially outwards to exert a clamping force on the mounted outer cutting tool 20, through which, the outer cutting tool 20 is clampable to the tool holder 12, and the inner clamp wall 34 is also elastically deflectable radially inwards to exert a clamping force on the mounted inner cutting tool 16, through which, the inner cutting tool 16 is clampable to the tool holder 12.

The inner clamp wall 34 and the outer clamp wall 32 are respectively formed in a ring shape and respectively coaxially encircle the tool rotational axis 14.

The hydraulic chamber 30 further includes a first hydraulic chamber section 36 formed in a distal (i.e., distal to the drive side 23 of the tool holder 12) axial end section 38 of the tool mounting end section 24 of the tool holder 12 and formed ring-shaped and coaxially encircling the tool rotational axis 14 and defined radially outwards by a first outer peripheral clamp wall section 40 of the outer clamp wall 32 and defined radially inwards by a first inner peripheral clamp wall section 42 of the inner clamp wall 34, so that the clamping force exerted by the first outer peripheral clamp wall section 40 and by the first inner peripheral clamp wall section 42 is transferred radially between the first outer and the first inner peripheral clamp wall section 40, 42 via the hydraulic fluid present in the first hydraulic chamber section 36.

The hydraulic chamber further includes a second, outer hydraulic chamber section 44 formed in a section 46 of the tool mounting end section 24 of the tool holder 12 that is axially adjacent to the distal (in a direction to the drive side 23) axial end section 38 and is formed ring-shaped and encircling the tool rotational axis 14 and defined radially outwards by a second outer peripheral clamp wall section 48 of the outer clamp wall, and wherein the hydraulic chamber 30 includes a second, inner hydraulic chamber section 50 formed in the section 46 of the tool mounting end section 24 of the tool holder 12 that is axially adjacent to the distal axial end section 38, optionally formed axially level with the second outer hydraulic chamber section 44, and formed ring-shaped and coaxially encircling the tool rotational axis 14 and defined radially inwards by a second inner peripheral clamp wall section 52 of the inner clamp wall 34, wherein an annular wall 54 of the tool mounting end section 24 extending coaxially around the tool rotational axis 14 extends radially between the second outer hydraulic chamber section 44 and the second inner hydraulic chamber section 50, by which the clamping force exerted radially outwards by the second outer peripheral clamp wall section 48 on the mounted outer cutting tool 20 and the clamping force exerted radially inwards by the second inner peripheral clamp wall section on the inner cutting tool 16 are respectively opposingly, i.e., radially inwards and radially outwards, respectively, counteractable (i.e., at least substantially counteractable).

The radial, elastic flexibility of the second outer peripheral clamp wall section 48 is, for example, greater than the radial, elastic flexibility of the first outer peripheral clamp wall section 40, so that based on an equal hydraulic pressure, which is present in the hydraulic chamber 30 and thereby in all of its hydraulic chamber sections 36, 44, 50, the clamping force exerted by the second outer peripheral clamp wall section 48 is greater than the clamping force exerted by the first outer peripheral clamp wall section 40.

The first outer peripheral clamp wall section 40 has, for example, a radial wall thickness t40 that is greater than the radial wall thickness t48 of the second outer peripheral clamp wall section 48.

The hydraulic chamber 30 further includes a pressure chamber section 60, which is defined by a movable piston 62 (see FIG. 3), through which movement thereof varies the volume of the pressure chamber section 60 to a corresponding increase and decrease of the hydraulic pressure in the hydraulic chamber 30.

The movable piston 62 is constituted here as a set screw, which is variably screwable in and out of the pressure chamber section 60. The movable piston 62, and, for example, the set screw, may be provided, for example, at its head-end, with a sealing element (not shown), for example, a plastic sealing element, to thereby achieve a, for example, improved, piston seal against the inner wall of the pressure chamber section 60.

The pressure chamber section 60 is hydraulically connected with the second inner hydraulic chamber section 50 via a first hydraulic connection channel 64 and is hydraulically connected with the second, outer hydraulic chamber section 44 via a second connection channel 66 differing from the first connection channel 64.

The first hydraulic chamber section 36 is directly hydraulically connected with the second, inner hydraulic chamber section 50 or is axially joined directly thereto and is only indirectly hydraulically connected, for example, via the pressure chamber section 60 as shown here, with the second, outer hydraulic chamber section 44.

The second, outer hydraulic chamber section 44 extends coaxially around the tool rotational axis 14 completely radially farther outwards than the first hydraulic chamber section 36. In this non-limiting embodiment, the second, inner hydraulic chamber section 50 extends to, for example, substantially the same radial level as the first hydraulic chamber section 36.

The outer cutting tool 20 is provided with a number of cutting edges 70, which are firmly mounted to a cutting edge holder 72 of the outer cutting tool 20. The cutting edges 70 are formed, for example, from a material differing from the cutting edge holder 72. The cutting edge holder 72 has an inner peripheral surface 74, which fits on the tool mounting (outer) peripheral surface 28 of the tool holder 24, and against which, the clamping forces of the outer peripheral clamp wall sections 40, 48 are exerted radially outwards. The cutting edges 70 with the mounted outer cutting tool 20, are arranged, as may be seen in FIGS. 2 and 3, for example, axially level with the first hydraulic chamber 36. Furthermore, the cutting edges 70 are arranged (at least partially) on an axial shoulder 75 of the outer cutting tool 20, which extends, with a mounted outer cutting tool 20, axially level with the first hydraulic chamber section 36, wherein this axial shoulder 75 slopes or may slope at a slight incline in the axial direction. Thus, the mounted cutting edge holder 72 and the therewith mounted outer cutting tool 20 further have a larger radial diameter axially level with the second hydraulic chamber sections 44, 50, than axially level with the first hydraulic chamber section 36.

Figure 1:
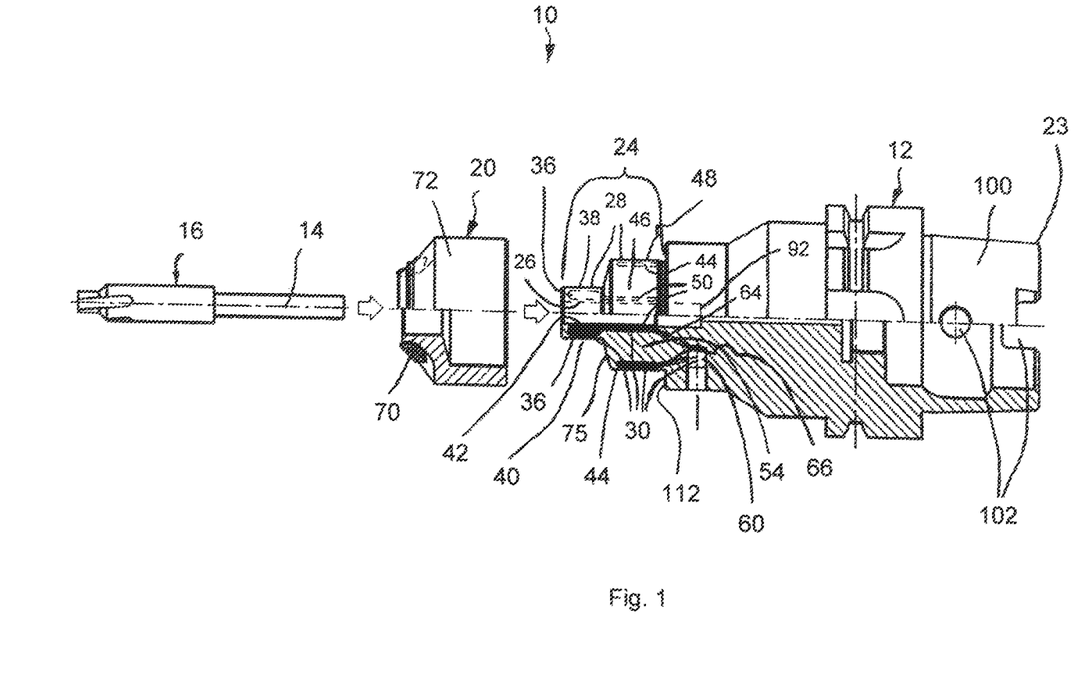
in FIG. 1, an exploded side view with a partial cross-section of a combination tool according to a non-limiting embodiment of the present disclosure, in FIG. 2, a side view with a partial cross-section of the combination tool of FIG. 1 in assembled form, in FIG. 3, a perspective view with a partial cross-section of the combination tool of FIGS. 1 and 2, in FIG. 4, a perspective view with a partial cross-section of a tool holder of the combination tool of FIGS. 1-3 according to a non-limiting embodiment of the present disclosure, and in FIGS. 5A-5D, possible applications of the combination tool according to the present disclosure.
Figure 2:
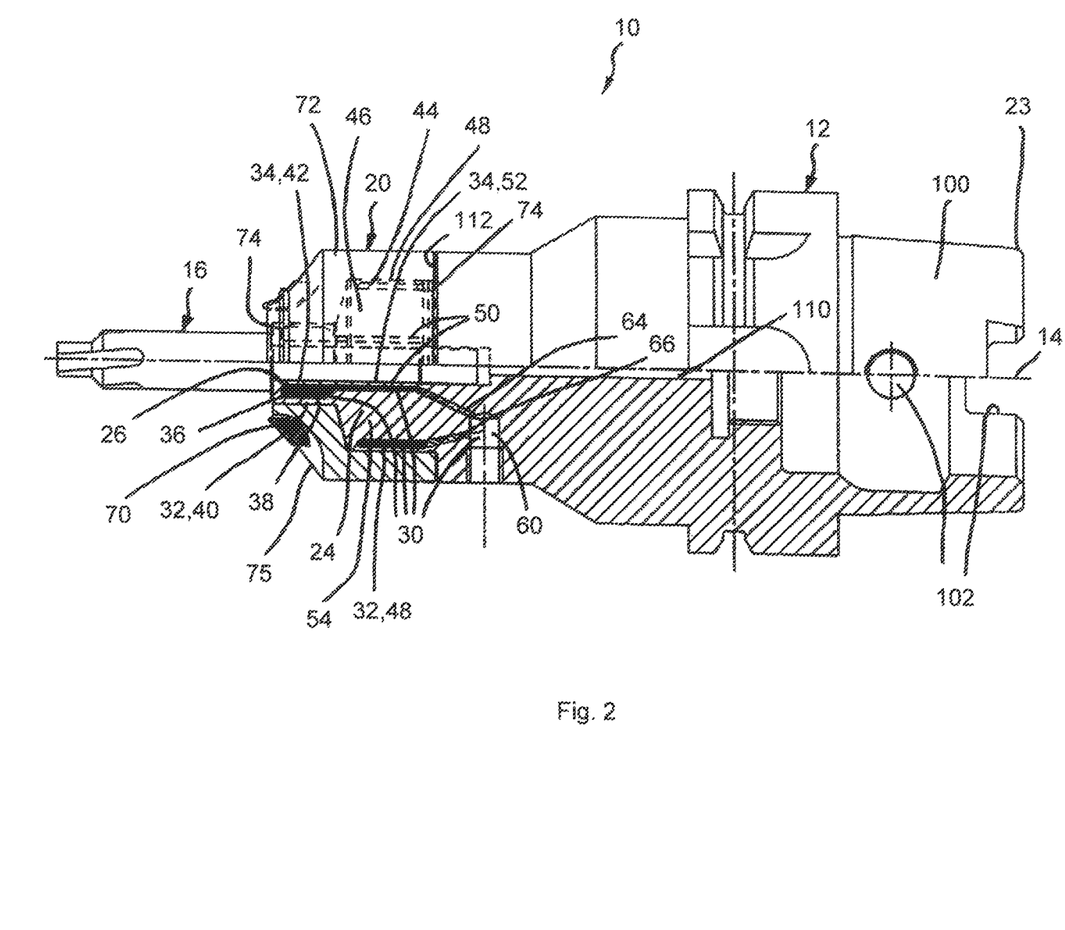
Figure 3:
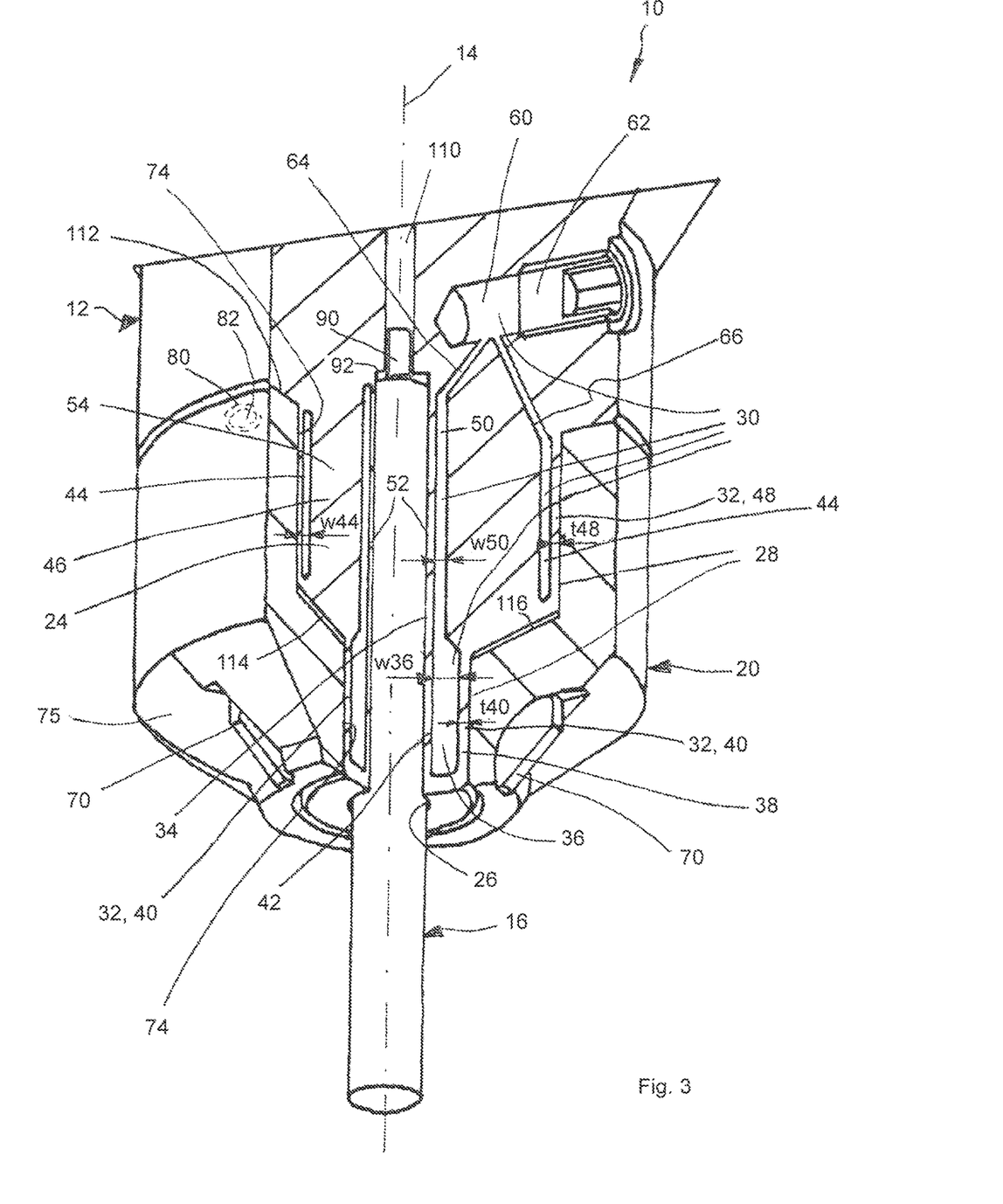
Figure 4:
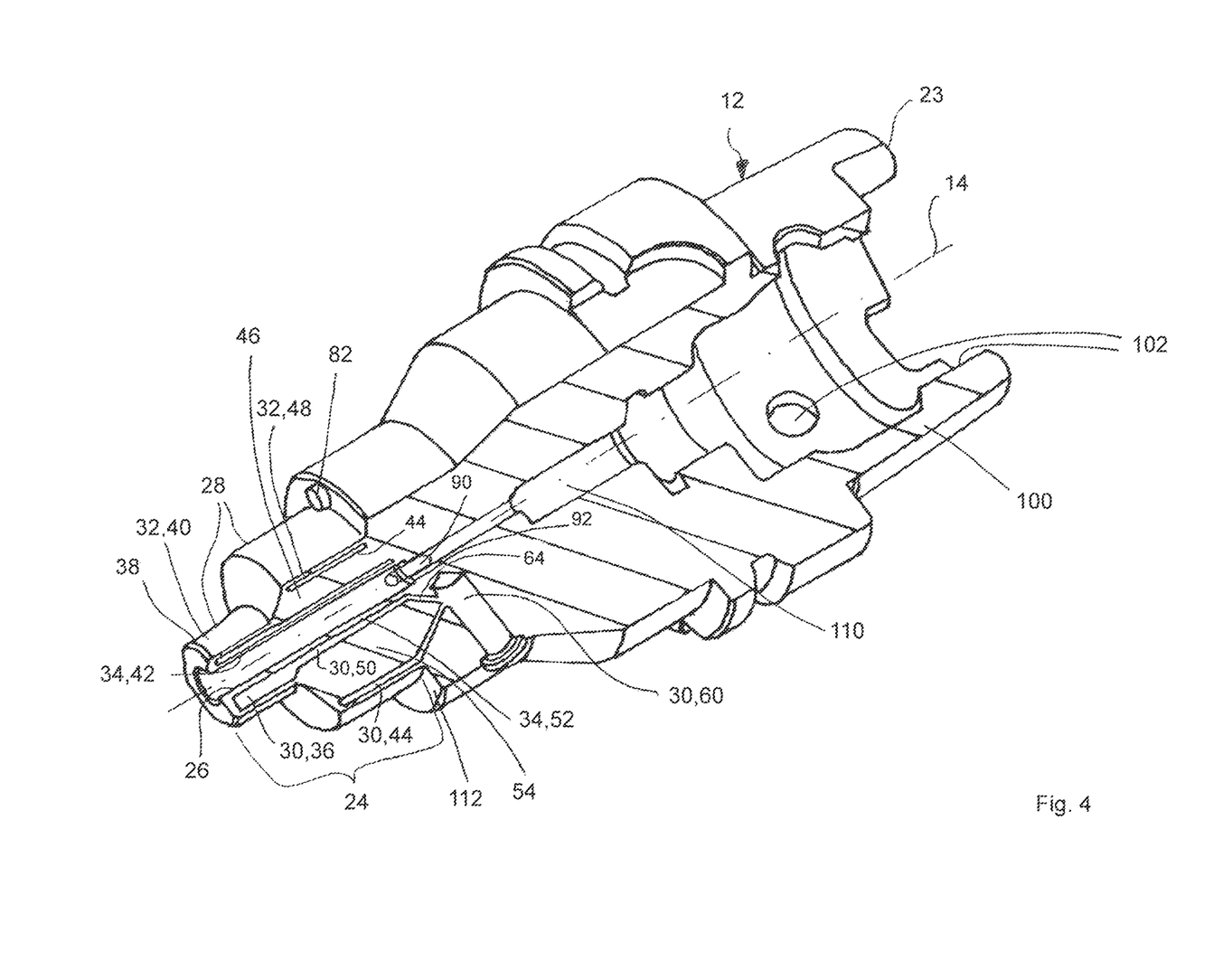

As may be further seen in FIGS. 2 and 3, the outer cutting tool 20, when mounted on the tool holder 12, is axially level with the second, outer hydraulic chamber section 44 and free from cutting edges.

The outer cutting tool 20 is further provided with an axial recess 80 (see FIG. 3), for example, on a front end facing the tool holder 12, wherein the tool holder 12 is provided with an axial protrusion (see FIGS. 3 and 4) corresponding to the recess 80, which, with the mounted outer cutting tool 20, engages form-fitting in the recess 80, to at least support the transfer of torque around the tool rotational axis 14 from the tool holder 12 to the outer cutting tool 20.

The radial thickness (or width) w36 of the first hydraulic chamber section 36 is greater than the radial thickness (or width) w44 of the second, outer hydraulic chamber section 44 and the radial thickness (or width) w50 of the second, inner hydraulic chamber section 50.

The tool holder 12 further includes in the tool mounting opening 26 an axial stop, that is constituted by a set screw 90 that is variably axially screwable in the tool mounting opening 26 and which the mounted inner cutting tool 16 can butt against, so that an axial displaceability of the inner cutting tool 16 in a direction into the tool mounting opening 26 is limited by the axial stop constituted by the set screw 90.

Without provision of the set screw 90, the axial stop may be constituted by an axial shoulder 92 in the tool mounting opening 26, wherein the axial stop would then not be adjustable.

The tool holder 12 further includes a drive mounting end section 100 situated at the drive side 23, axially opposite to the tool mounting end section 24, which includes a drive mounting coupling part 102, that is formed in such a way that, relative to the tool rotational axis 14, in a form-fitting or interference fitting engagement for co-rotation with a drive coupling part (not shown) of a rotary drive (not shown).

The tool holder 12 may further have one or more cooling channels for delivering a cooling fluid; for example, a central cooling channel 110 is formed in the tool holder 12. The cooling channel 110 or the cooling channels may also serve to convey away machined material.

The tool holder 12 further has an axial shoulder stop 112 on which the mounted outer cutting tool 20 on a front end facing the drive side 23 is axially stopped and thereby is limited in a direction towards the drive side 23. Furthermore, the tool mounting end section 24 has an axial shoulder 114 substantially axially between the first hydraulic chamber section 36 and the second hydraulic chamber sections 44, 50, that is located at an axial distance to an inner axial shoulder 116 of the mounted outer cutting tool 20.

In the FIGS. 5A-5D possible uses or applications of the above-described combination tool 10 are depicted.

Figures 5A, 5B:
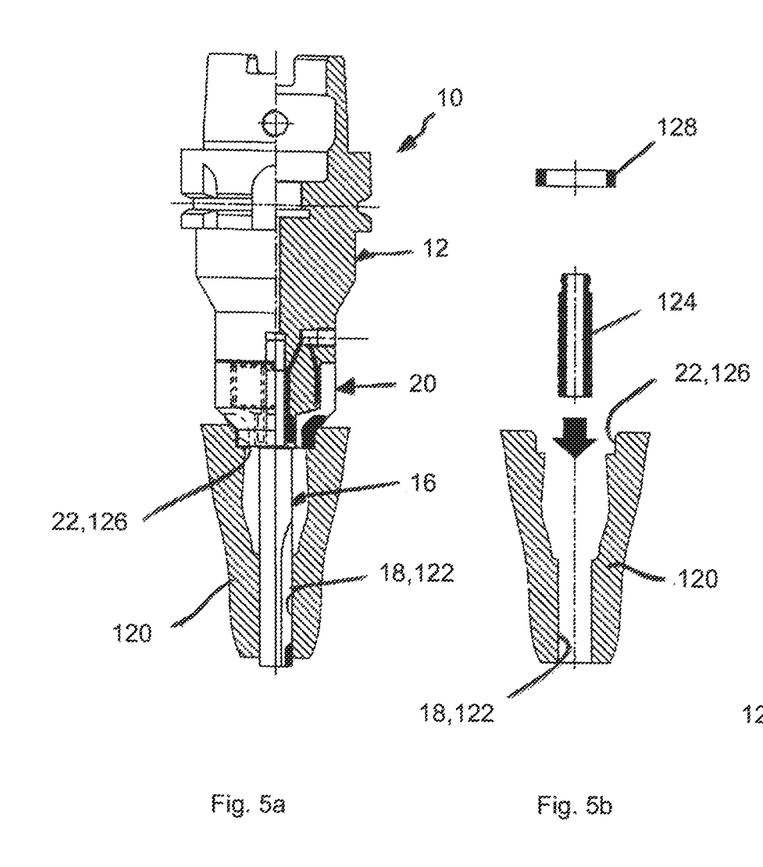

In FIG. 5A, the combination tool 10 is used to simultaneous machine, in a cylinder head 120 for a combustion engine, a first central hole 122, that constitutes a first hole region 18 and that is provided for mounting a valve guide bushing 124, and a thereto coaxial and radially outwards recess 126, that constitutes a second hole region 22 and that serves for mounting a valve seat ring 128 in the cylinder head 120. The central hole 120 is here machined by the inner cutting tool 16, and the recess 126 is machined by the outer cutting tool 20.

In accordance with FIG. 5B, after the machining according to FIG. 5A has been carried out, the guide bushing 124 is installed in the central hole 120 and the valve seat ring 128 is installed in the recess 126.

Figures 5C, 5D:
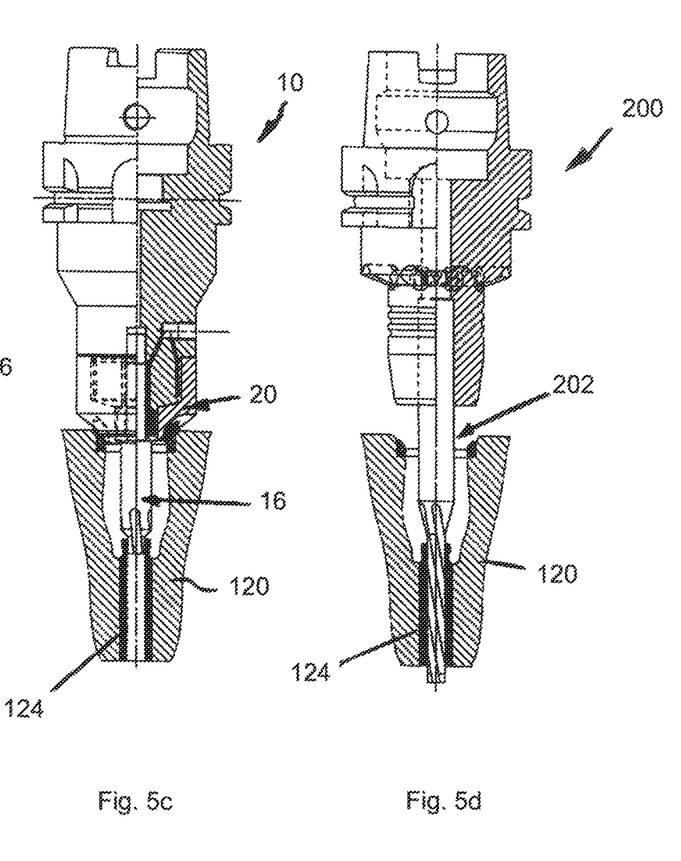

Afterwards, as may be seen in FIG. 5C, simultaneous machining of an upper section of the inner peripheral surface of the installed guide bushing 124 and an upper section of the inner peripheral surface as well as an inner section of the front end of the valve seat ring 128 is carried out by the combination tool 10. Here, the guide bushing 124 is machined by an inner cutting tool 16, which differs in the type of cutting with respect to the inner cutting tool 16 used in FIG. 5A. Similarly, in the processing in FIG. 5C an outer cutting tool is used, which differs in the type of cutting with respect to the outer cutting tool 20 used in FIG. 5A.

As may be seen in FIG. 5D, finally, an entire inner peripheral surface of the guide bushing 124 is finished by machining, for example, by a tool 200 different from the combination tool 10 by a central cutting tool part 202 attached thereto. The finishing of the guide bushing 124 shown in FIG. 5D may, however, also be performed, for example, by an inner cutting tool 16 of the combination tool 10 according to the present disclosure designed in accordance with the cutting tool part 202, wherein the outer cutting tool 20 would, for example, not contact the workpiece being machined.

What is claimed is:

1. A combination tool comprising:
   an inner cutting tool configured to machine a first hole region;
   an outer cutting tool configured to machine a second hole region, the first hole region being centrally located relative to the second hole region that is located radially outwards relative to the first hole region, the outer cutting tool being sleeve-shaped; and
   a tool holder extending along a rotational axis of the combination tool, the rotational axis defining an axial extension, the tool holder comprising:
      a tool mounting end section axially located at a distal end of the tool holder and extending radially between the inner cutting tool and the outer cutting tool, the tool mounting end section comprising:
         a central tool mounting opening configured for mounting the inner cutting tool;
         a distal axial end section of the tool mounting end section;
         a section of the tool mounting end section located axially adjacent to the distal axial end section;
      a hydraulic chamber formed in the tool mounting end section, the hydraulic chamber configured to contain a hydraulic fluid, the hydraulic chamber comprising:
         a second outer hydraulic chamber section formed in the section, the second outer hydraulic chamber section formed ring-shaped and encircling the rotational axis; and
         a second inner hydraulic chamber section formed in the section, the second inner hydraulic chamber section formed ring-shaped and encircling the rotational axis;
      an outer clamp wall configured to elastically deflect radially outwards, the outer clamp wall comprising:
         a second outer peripheral clamp wall section defining the second outer hydraulic chamber section radially outwards;
      an inner clamp wall configured to elastically deflect radially inwards, the inner clamp wall comprising:
         a second inner peripheral clamp wall section defining the second inner hydraulic chamber section radially inwards;
      an annular wall extending radially between the second outer hydraulic chamber section and the second inner hydraulic chamber section; and
      a tool mounting peripheral surface surrounding the central tool mounting opening configured for mounting the outer cutting tool;
   wherein
      the hydraulic chamber is configured to variably set the hydraulic fluid under a hydraulic pressure;
      the outer clamp wall and the inner clamp wall define sections of the hydraulic chamber and are configured so that when hydraulic pressure in the hydraulic chamber is increased:
         the outer clamp wall elastically deflects outwards, which is configured to exert a clamping force on the outer cutting tool to clamp the outer cutting tool to the tool holder; and
         the inner clamp wall elastically deflects inwards, which is configured to exert a clamping force on the inner cutting tool to clamp the inner cutting tool to the tool holder; and
      the annular wall is configured to counteract the clamping force exerted by the second outer peripheral clamp wall section on the outer cutting tool and the clamping force exerted by the second inner peripheral clamp wall section on the inner cutting tool.

2. The combination tool according to claim 1, wherein the hydraulic chamber further comprises:
   a first hydraulic chamber section formed in the distal axial end section, the first hydraulic chamber section formed ring-shaped and encircling the rotational axis;
the outer clamp wall further comprises:
   a first outer peripheral clamp wall section defining the first hydraulic chamber section radially outwards; and
the inner clamp wall further comprises:
   a first inner peripheral clamp wall section defining the first hydraulic chamber section radially inwards;
wherein
the first hydraulic chamber section is configured to exert:
   a clamping force by the first outer peripheral clamp wall end section and a clamping force by the first inner peripheral clamp wall end section, both of which, due to hydraulic fluid in the first hydraulic chamber section, are transferred radially between the first outer peripheral clamp wall end section and the first inner peripheral clamp wall end section.

3. The combination tool according to claim 2, wherein the second outer peripheral clamp wall section has a radial elastic flexibility greater than a radial elastic flexibility of the first outer peripheral clamp wall section; and based on an equal hydraulic pressure, the second outer peripheral clamp wall section is configured to exert a clamping force greater than a clamping force of the first outer peripheral clamp wall section.

4. The combination tool according to claim 3, wherein the first outer peripheral clamp wall section has a radial wall thickness that is greater than a radial wall thickness of the second outer peripheral clamp wall section.

5. The combination tool according to claim 2, wherein the hydraulic chamber further comprises:
a pressure chamber section comprising a movable piston configured to vary a volume of the hydraulic chamber that corresponds to an increase or decrease of the hydraulic pressure in the hydraulic chamber.

6. The combination tool according to claim 5, wherein the pressure chamber section is hydraulically connected with:
the second inner hydraulic chamber section via a first connection channel and
the second outer hydraulic chamber section via a second connection channel differing from the first connection channel.

7. The combination tool according to claim 5, wherein the first hydraulic chamber section is directly hydraulically connected with the second inner hydraulic chamber section and only indirectly hydraulically connected with the second outer hydraulic chamber section via the pressure chamber section.

8. The combination tool according to claim 2, wherein the second outer hydraulic chamber section extends farther radially outwards than the first hydraulic chamber section.

9. The combination tool according to claim 2, wherein the outer cutting tool comprises:
a plurality of cutting edges that are arranged at an axial position level with the first hydraulic chamber section when the outer cutting tool is mounted on the tool holder.

10. The combination tool according to claim 9, wherein the outer cutting tool is free from the plurality of cutting edges at an axial position level with the second outer hydraulic chamber section when the outer cutting tool is mounted on the tool holder.

11. The combination tool according to claim 2, wherein the first hydraulic chamber section has a radial width greater than a radial width of the second outer hydraulic chamber section and/or a radial width of the second inner hydraulic chamber section.

12. The combination tool according to claim 1, wherein the outer cutting tool further comprises:
an axial protrusion of the outer cutting tool extending in a direction parallel to the rotational axis or
an axial recess of the outer cutting tool extending in a direction parallel to the rotational axis;
the tool holder further comprises:
an axial protrusion of the tool holder extending in a direction parallel to the rotational axis, the axial protrusion of the tool holder configured to engage form-fitting with the axial protrusion of the outer cutting tool or the axial recess of the outer cutting tool to assist a transfer of torque around the rotational axis from the tool holder to the outer cutting tool.

13. The combination tool according to claim 1, wherein the tool holder further comprises:
an axial stop in the tool mounting opening, the axial stop extending in a direction parallel to the rotational axis and configured to butt against the inner cutting tool and limit axial displacement of the inner cutting tool in a direction into the tool mounting opening.

14. A tool holder for a combination tool, the tool holder extending along a rotational axis of the combination tool, the rotational axis defining an axial extension, the tool holder comprising:
a tool mounting end section axially located at a distal end of the tool holder, the tool mounting end section configured to mount an inner cutting tool and an outer cutting tool and extend radially between the inner cutting tool and the outer cutting tool, the tool mounting end section comprising:
a central tool mounting opening configured for mounting the inner cutting tool;
a distal axial end section of the tool mounting end section;
a section of the tool mounting end section located axially adjacent to the distal axial end section;
a hydraulic chamber formed in the tool mounting end section, the hydraulic chamber configured to contain a hydraulic fluid, the hydraulic chamber comprising:
a first hydraulic chamber section formed in the distal axial end section, the first hydraulic chamber section formed ring-shaped and encircling the rotational axis;
a second outer hydraulic chamber section formed in the section, the second outer hydraulic chamber section formed ring-shaped and encircling the rotational axis; and
a second inner hydraulic chamber section formed in the section, the second inner hydraulic chamber section formed ring-shaped and encircling the rotational axis;
an outer clamp wall configured to elastically deflect radially outwards, the outer clamp wall comprising:
a first outer peripheral clamp wall section defining the first hydraulic chamber section radially outwards; and
a second outer peripheral clamp wall section defining the second outer hydraulic chamber section radially outwards;
an inner clamp wall configured to elastically deflect radially inwards, the inner clamp wall comprising:
a first inner peripheral clamp wall section defining the first hydraulic chamber section radially inwards; and
a second inner peripheral clamp wall section defining the second inner hydraulic chamber section radially inwards;
an annular wall extending radially between the second outer hydraulic chamber section and the second inner hydraulic chamber section; and
a tool mounting peripheral surface surrounding the central tool mounting opening configured for mounting the outer cutting tool;

wherein
the hydraulic chamber is configured to variably set the hydraulic fluid under a hydraulic pressure;
the outer clamp wall and the inner clamp wall define sections of the hydraulic chamber and are configured so that when hydraulic pressure in the hydraulic chamber is increased:
the outer clamp wall elastically deflects outwards, which is configured to exert a clamping force on the outer cutting tool to clamp the outer cutting tool to the tool holder; and
the inner clamp wall elastically deflects inwards, which is configured to exert a clamping force on the inner cutting tool to clamp the inner cutting tool to the tool holder;
the first hydraulic chamber section is configured to exert:
a clamping force by the first outer peripheral clamp wall section and a clamping force by the first inner peripheral clamp wall section,
both of which, due to hydraulic fluid in the first hydraulic chamber section, are transferred radially between the first outer peripheral clamp wall section and the first inner peripheral clamp wall section; and
the annular wall is configured to counteract the clamping force exerted by the second outer peripheral clamp wall section on the outer cutting tool and the clamping force exerted by the second inner peripheral clamp wall section on the inner cutting tool.

15. The tool holder according to claim 14, wherein
the second outer peripheral clamp wall section has a radial elastic flexibility greater than a radial elastic flexibility of the first outer peripheral clamp wall section; and
based on an equal hydraulic pressure, the second outer peripheral clamp wall section is configured to exert a clamping force greater than a clamping force of the first outer peripheral clamp wall section.

16. The tool holder according to claim 14, wherein
the first outer peripheral clamp wall section has a radial wall thickness that is greater than a radial wall thickness of the second outer peripheral clamp wall section.

17. The tool holder according to claim 14, wherein
the hydraulic chamber further comprises:
a pressure chamber section comprising a movable piston configured to vary a volume of the hydraulic chamber that corresponds to an increase or decrease of the hydraulic pressure in the hydraulic chamber.

18. The tool holder according to claim 17, wherein
the pressure chamber section is hydraulically connected with:
the second inner hydraulic chamber section via a first connection channel and
the second outer hydraulic chamber section via a second connection channel differing from the first connection channel.

19. The tool holder according to claim 17, wherein
the first hydraulic chamber section is directly hydraulically connected with the second inner hydraulic chamber section and only indirectly hydraulically connected with the second outer hydraulic chamber section via the pressure chamber section.

20. The tool holder according to claim 14, wherein
the second outer hydraulic chamber section extends farther radially outwards than the first hydraulic chamber section.

21. The tool holder according to claim 14 further comprising:
an axial stop in the tool mounting opening, the axial stop extending in a direction parallel to the rotational axis and configured to butt against the inner cutting tool and limit axial displacement of the inner cutting tool in a direction into the tool mounting opening.

* * * * *